May 31, 1932.  F. GRAUPNER  1,860,576

FLUID GEAR

Filed Jan. 18, 1928

Inventor:
Fritz Graupner
by
Atty.

Patented May 31, 1932

1,860,576

UNITED STATES PATENT OFFICE

FRITZ GRAUPNER, OF HANOVER, GERMANY

FLUID GEAR

Application filed January 18, 1928, Serial No. 247,707, and in Germany January 19, 1927.

My invention relates to fluid gears, for instance to hydraulic gears for motor cars and the like, of the type in which fluid such as oil is forced through pipes. It is an object of my invention to provide a gear of this type in which loss of power due to friction and complicated mechanisms as involved in gears having only partly mechanical gearing and a rotary container for the driving medium, are avoided.

To this end, and with a view to simplifying the construction and improving the efficiency as compared with the devices aforesaid, I have designed a gearing having a driving and a driven part operatively connected by flowing liquid, for instance, a turbine impeller, a propeller or the like on the driving, and similar means on the driven shafts, respectively, these rotary parts being arranged in a stationary casing and rotating in a medium which will be referred to as "oil", but obviously may be any other suitable liquid or fluid, and is drawn from the casing by the rotation of the driving shaft and returned to the casing after having imparted rotation to the driven shaft.

It is another object of my invention to provide means for rendering the gear temporarily inert so as to permit the oil to circulate when the driving shaft is rotating without imparting rotation to the driven shaft.

It is still another object of my invention to provide means for varying the area through which the oil circulates and the angle at which it strikes the vanes of the impeller on the driving shaft so as to provide means for an additional regulation of the speed of the driven shaft and for exerting a braking action on the driven shaft, and to this latter end I may design the regulating means aforesaid so as to retard or arrest the flow of oil with respect to the impeller on the driven shaft.

In the drawings affixed to this specification and forming part thereof a gear embodying my invention is illustrated diagrammatically by way of example.

Figure 1:
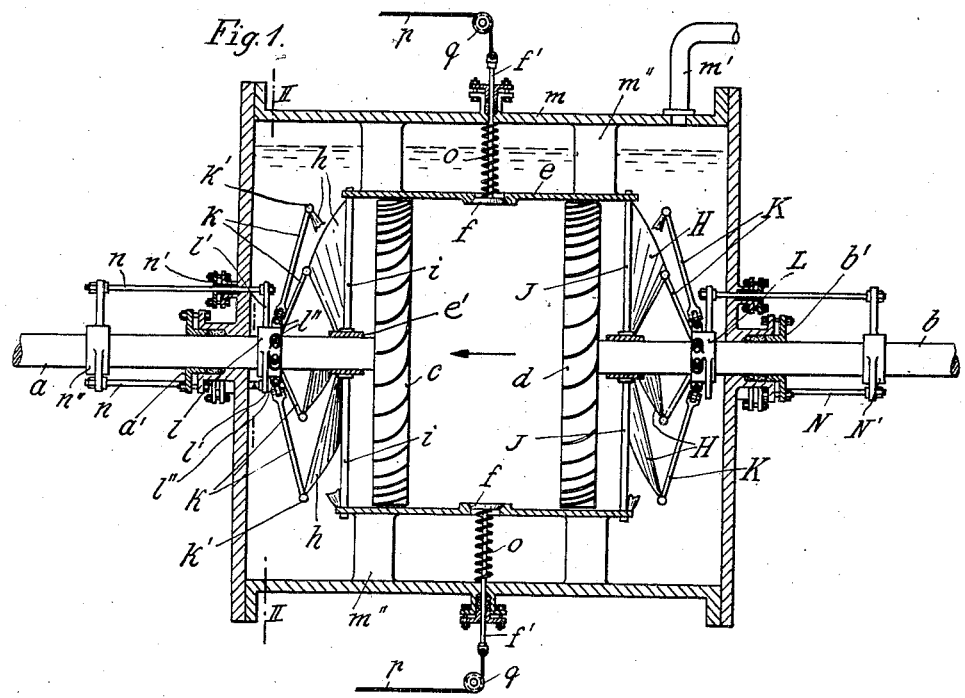
Fig. 1 is an axial section of a gear according to my invention.

Referring now to the drawings, $a$ is the driving shaft and $b$ is the driven shaft of the gear. Rotation is imparted to the driving shaft by any suitable means, not shown, for instance the engine of a motor car, to the wheels of which the driven shaft $b$ is connected. $c$ and $d$ are turbine impellers, secured to the ends of the driving and the driven shafts, respectively. $e$ is a cylindrical casing open at both ends, in which the impellers $c$, $d$ are rotatably mounted, and $m$ is a casing of larger diameter surrounding the casing $e$ and provided with an oil supply pipe $m'$, both casings being stationary and connected by stays $m''$, or other suitable means. The shafts $a$ and $b$ are inserted in the covers of the casing $m$ through stuffing boxes $a'$ and $b'$, respectively.

Figure 2:
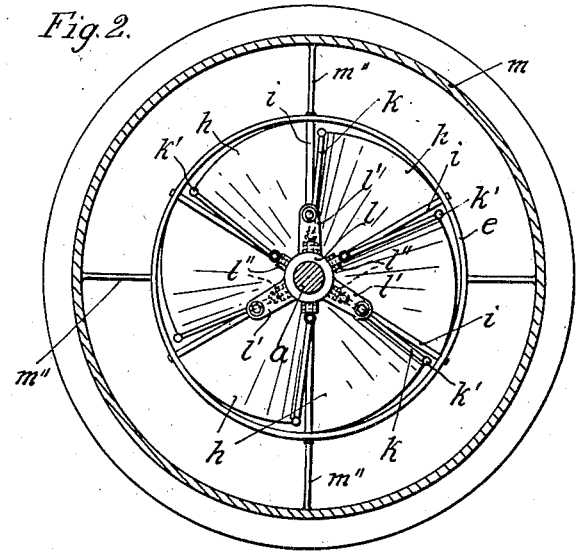
Fig. 2 is a section on the line II—II in Fig. 1.

In the example illustrated, means are provided for regulating the area at the open ends of the casing $e$ and such means are shown as dampers $h$, in the present instance six, at the discharge side of the impeller $c$, which are fulcrumed in the casing $e$ about radial shafts $i$. The dampers $h$, as will appear from Fig. 2, are sector-shaped and their shafts $i$ are fulcrumed in the casing $e$ at their outer ends and in a sleeve $e'$ at their inner ends, the sleeve $e'$ surrounding the shaft $a$ but not partaking in its rotation. The sleeve $e'$ may be cast integral with the casing $e$. It is understood that instead of sectors as shown, dampers of any other suitable configuration may be provided. $l$ is a sleeve adapted to slide axially on the shaft $a$ but held against rotation by means that will be described, $l'$ is a spider having, in the present instance, three arms, $l''$ are eyes on the sleeve $l$ one for each of the dampers $h$, $k$ are connecting rods extending from the eyes $l''$ to the ends of the dampers $h$ and connected therewith by means of ball-and-socket joints $k'$ or any other suitable means permitting rocking movement of the dampers about their shafts $i$ without interfering with the axial movement of the sleeve $l$. $n$ are stays extending in parallel to the axis of the gearing, $n'$ are stuffing boxes by which the stays are carried through the cover at the corresponding end of the casing $m$, and $n''$ is a sleeve similar to the sleeve $l$ and having a spider to which the stays $n$ are connected. Any suitable means, not shown, may be provided for displacing the sleeve $m''$ axially on the shaft $a$ and it will be understood that when such displacement occurs the dampers $h$ will be rocked about their shafts $i$ and the free area of the casing $e$ at the discharge side of the impeller $c$ will be varied, or the casing will be completely closed, as the case may be.

Similar means comprising dampers H on shafts I, sleeves L and N', stays N and connecting rods K, may be provided at the inlet side of the turbine $d$ for regulating the free area of the casing at this end or for closing it altogether, as described.

$f$ are valves in the barrel of the inner casing $e$ which are forced from their seats by springs $o$ and may be seated by any suitable means, for instance a cable $p$ on a pulley $q$ which cable is attached to the spindle $f'$ of the valve $f$. Any number of valves $f$ may be provided, two valves being shown by way of example.

The operation of the gear is as follows:

The gear is normally operated in the usual manner, with the impeller $c$ on the driving shaft acting as the pump, and the impeller $d$ on the driven shaft acting as the motor, with the liquid circulating from the right to the left in Fig. 1, i. e., from the impeller $d$ to the impeller $c$. The valves $f$ are closed for the normal operation, and the dampers $h$ and H are full open or partly closed as required for the desired ratio of power transmission. The impeller $c$ on the driving shaft $a$ draws liquid from the outer casing $m$ into the inner casing $e$ through the dampers H and through the impeller $d$ on the driven shaft $b$, and returns the liquid to the casing through the dampers $h$. In this manner a continuous circulation of the liquid in the casings $m$ and $e$ is established and imparts rotation to the driven impeller or motor $d$.

If it is desired to cut out the gear while the driving shaft $a$, with the impeller $c$, still rotates, the valves $f$ are opened, and the circulation of the liquid between the casing $m$ and $e$ is short-circuited through the openings of the valves. The liquid now is drawn into the inner casing $e$ through the valve openings and returned to the outer casing through the dampers $h$ without influencing the impeller $d$ on the driven shaft $b$.

The gear may also act as a brake against the rotation of the driven shaft $b$. If it is desired to use the gear as a brake, the driving shaft $a$ is arrested, the dampers $h$ for the impeller $c$, and the valves $f$ are closed while the dampers H for the impeller $d$ are opened. The impeller $d$ still rotates under the inertia action of the vehicle or the like to which it is connected and now acts as a pump which tends to draw the liquid through the open dampers H and force it into the inner casing $e$. By these means a strong resistance is opposed to the rotation of the impeller $d$ on the driven shaft $b$.

The air in the casing $m$ may be utilized for generating an assisting starting torque. In order to store a supply of air under pressure for this purpose the impeller $c$ on the driving shaft $a$ is started with the dampers H closed or partly closed, drawing liquid from the casing $e$ and delivering it to the casing $m$ through the dampers $h$ and generating a partial vacuum in front of the impeller $d$ on the driven shaft $b$. When the dampers H are now fully opened the liquid flows into the casing $e$ under the considerable excess pressure of the air cushion and the suction of the partial vacuum in the casing $e$ and imparts starting torque to the impeller $d$ on the driven shaft, in addition to the torque exerted by the engine. In this manner, the static friction is overcome more readily than in existing gears.

Instead of partly filling the casing, a separate air chamber may be provided in which a piston is reciprocating against resilient reaction, or the casing $m$ may be made from resilient material, as rubber, so as to obtain a supply of energy, which may be utilized when starting the shaft $b$.

When the impeller $c$ is rotating while the dampers H are closed or partly closed so as to restrict the free area of the inner casing to a considerable extent, the quantity of liquid which the impeller $c$ draws from the inner casing $e$ is in excess of the quantity of liquid admitted by the dampers H and therefore pressure will build up in the casing $m$, compressing the air cushion in the impeller while its volume is reduced. Under these conditions, a zone of reduced pressure will form at the inner side of the impeller $d$ while its outer side is under the pressure of the liquid in the casing $m$ this pressure being admitted through the gaps or leaks between the dampers H. The pressure reacting on the impeller $c$ is also increased but a very considerable starting torque will be available when the driven impeller $d$ is thrown in.

I wish it to be understood that I do not desire to be limited to the exact details of construction shown and described for obvious modifications will occur to a person skilled in the art.

I claim:—

1. A fluid gear comprising a driving and a driven shaft, an impeller on each shaft, an inner casing which is open at both ends and adapted to receive said impellers, an outer casing surrounding said inner casing and communicating therewith at said open ends, blades in each impeller which are rigidly connected with its respective shaft, means in said inner casing adapted to connect it to said outer casing, and means at one of the open ends of said inner casing for varying the free area of said open end.

2. A fluid gear comprising a driving and a driven shaft, an impeller on each shaft, an inner casing which is open at both ends and adapted to receive said impellers, an outer casing surrounding said inner casing and communicating therewith at said open ends, blades in each impeller which are rigidly connected with its respective shaft, means in said inner casing adapted to connect it to said outer casing, and means at the open ends of said inner casing for varying the free area of said open ends.

3. A fluid gear comprising a driving and a driven shaft, an impeller on each shaft, an inner casing which is open at both ends and adapted to receive said impellers, an outer casing surrounding said inner casing and communicating therewith at said open ends, blades in each impeller which are rigidly connected with its respective shaft, and means at one of the open ends of said inner casing for varying the free area of said open end.

In testimony whereof I affix my signature.

FRITZ GRAUPNER.